(12) United States Patent
Williamson et al.

(10) Patent No.: US 6,571,960 B2
(45) Date of Patent: Jun. 3, 2003

(54) FAUCET-MOUNTED WATER FILTRATION DEVICE

(75) Inventors: Bruce S. Williamson, Alpharetta, GA (US); Malcolm D. Poirier, Marietta, GA (US); Jeffrey E. Fish, Dacula, GA (US); Kevin P. McGrath, Alpharetta, GA (US); Paul Metaxatos, Brookline, MA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/835,834

(22) Filed: Apr. 16, 2001

(65) Prior Publication Data
US 2002/0005379 A1 Jan. 17, 2002

Related U.S. Application Data
(60) Provisional application No. 60/200,799, filed on May 1, 2000.

(51) Int. Cl.$^7$ .......................... B01D 27/08; B01D 35/04
(52) U.S. Cl. .......................... 210/420; 210/85; 210/94; 210/282; 210/232; 210/335; 210/449; 251/309
(58) Field of Search .......................... 210/85, 117, 130, 210/282, 232, 449, 94, 424, 420, 433.1, 421, 335, 460; 137/625.29, 625.31, 625.47; 251/309, 341, 352, 310

(56) References Cited

U.S. PATENT DOCUMENTS

| 1,202,370 A | * | 10/1916 | Schneck |
| 2,773,601 A | | 12/1956 | Keller et al. |
| 2,830,618 A | | 4/1958 | Mitchell |
| 3,016,599 A | * | 1/1962 | Perry |

(List continued on next page.)

FOREIGN PATENT DOCUMENTS

| DE | 4031764 A1 | 2/1992 |
| EP | 775860 A2 | 5/1997 |
| EP | 896176 A2 | 2/1999 |
| EP | 0896176 A3 | 2/1999 |
| JP | 07-20437 | * 8/1995 |
| JP | 07-308666 | * 11/1995 |
| JP | 10-113654 | * 5/1998 |

OTHER PUBLICATIONS

V. A. Wente, "Superfine Thermoplastic Fibers", *Industrial and Engineering Chemistry*, vol. 48, No. 8, pp. 1342–1346 (1956).

V. A. Wente et al., "Manufacture of Superfine Organic Fibers", Navy Research Laboratory, Washington, D.C., NRL Report 4634 (111437), dated May 25, 1954, U.S. Dept. of Commerce, Office of Technical Services.

(List continued on next page.)

*Primary Examiner*—Joseph Drodge
*Assistant Examiner*—Terry K. Cecil
(74) *Attorney, Agent, or Firm*—Dority & Manning (57) ABSTRACT

A fluid filtering device has a housing with a mounting mechanism disposed at the forward end and on the top surface of the housing. A fluid inlet is defined through the housing top surface, and at least one fluid outlet is defined through the housing bottom surface. A valve member is disposed within the housing between the fluid inlet and the fluid outlet. At least one filter is disposed longitudinally within a portion of the housing rearward of the mounting mechanism. The filter is in fluid communication with the fluid inlet and a fluid outlet and may be removable from the rear of the housing. An actuator extends from the forward end of the housing and is connected with the valve member through the housing. The actuator moves the valve member between a filtered and unfiltered position. In the filtered position, fluid is directed from the fluid inlet and through the rear portion of the housing containing the filter. Upon mounting of the filtering device to the end of a supply member, the portion of the housing containing the filter extends rearwardly from the end of the supply member and is disposed longitudinally adjacent to the supply member.

16 Claims, 5 Drawing Sheets

U.S. PATENT DOCUMENTS

| | | | |
|---|---|---|---|
| 3,038,610 A | | 6/1962 | Hetherington |
| 3,341,394 A | * | 9/1967 | Kinney |
| 3,593,707 A | | 7/1971 | Pifer |
| 3,655,862 A | * | 4/1972 | Dorschner et al. |
| 3,690,565 A | | 9/1972 | Abos |
| 3,692,618 A | * | 9/1972 | Dorschner et al. |
| 3,704,198 A | * | 11/1972 | Prentice |
| 3,705,068 A | * | 12/1972 | Dobo et al. |
| 3,755,527 A | * | 8/1973 | Keller et al. |
| 3,760,951 A | | 9/1973 | Mansfield |
| 3,780,869 A | | 12/1973 | Krongos |
| 3,789,991 A | | 2/1974 | Krongos |
| 3,802,817 A | * | 4/1974 | Matsuki et al. |
| 3,849,241 A | * | 11/1974 | Butin et al. |
| 3,853,651 A | * | 12/1974 | Porte |
| 3,917,172 A | | 11/1975 | O'Hare |
| 3,978,185 A | * | 8/1976 | Buntin et al. |
| 4,001,120 A | | 1/1977 | Gelman et al. |
| 4,064,605 A | * | 12/1977 | Akiyama et al. |
| 4,091,140 A | * | 5/1978 | Harmon |
| 4,100,319 A | * | 7/1978 | Schwartz |
| 4,100,324 A | * | 7/1978 | Anderson et al. |
| 4,107,046 A | | 8/1978 | Corder |
| 4,118,531 A | * | 10/1978 | Hauser |
| 4,147,631 A | | 4/1979 | Deines et al. |
| 4,172,796 A | | 10/1979 | Corder |
| 4,187,986 A | | 2/1980 | Petrovic |
| 4,212,743 A | | 7/1980 | Van Meter et al. |
| 4,284,078 A | | 8/1981 | Pace |
| 4,340,563 A | * | 7/1982 | Appel et al. |
| 4,405,297 A | * | 9/1983 | Appel et al. |
| 4,434,204 A | * | 2/1984 | Hartman et al. |
| 4,536,290 A | | 8/1985 | Bonazzo |
| 4,556,484 A | | 12/1985 | Hunter et al. |
| 4,595,500 A | | 6/1986 | Galbiati |
| 4,599,171 A | | 7/1986 | Padilla et al. |
| 4,627,811 A | * | 12/1986 | Greiser et al. |
| 4,644,045 A | * | 2/1987 | Fowells |
| 4,663,220 A | * | 5/1987 | Wisneski et al. |
| 4,674,687 A | | 6/1987 | Smith et al. |
| 4,686,037 A | | 8/1987 | Lang |
| 4,744,895 A | | 5/1988 | Gales et al. |
| 4,770,768 A | | 9/1988 | Lang |
| 4,808,109 A | | 2/1989 | Thornton |
| 4,863,103 A | | 9/1989 | Gannaway |
| 4,895,651 A | | 1/1990 | Middleton |
| 4,933,080 A | | 6/1990 | Rundzaitis et al. |
| D311,768 S | | 10/1990 | Woodruff |
| 4,980,056 A | | 12/1990 | Norton |
| D313,643 S | | 1/1991 | Luzenberg, Jr. |
| 5,017,286 A | | 5/1991 | Heiligman |
| 5,045,198 A | | 9/1991 | Norton |
| 5,103,856 A | | 4/1992 | Fleischmann |
| 5,108,606 A | | 4/1992 | Maglio |
| 5,127,427 A | | 7/1992 | Kajpust et al. |
| D328,942 S | | 8/1992 | Igami et al. |
| 5,151,179 A | | 9/1992 | Bach et al. |
| 5,158,234 A | | 10/1992 | Magnenat et al. |
| 5,192,427 A | | 3/1993 | Eger et al. |
| 5,192,436 A | | 3/1993 | Sasaki et al. |
| 5,194,156 A | | 3/1993 | Tomchak |
| 5,213,688 A | | 5/1993 | Robinson |
| 5,256,287 A | | 10/1993 | Underwood |
| D342,986 S | | 1/1994 | Kurth |
| 5,277,802 A | | 1/1994 | Goodwin |
| 5,277,828 A | | 1/1994 | Fleming |
| 5,279,324 A | | 1/1994 | Schutz et al. |
| 5,290,443 A | | 3/1994 | Norton |
| 5,316,216 A | | 5/1994 | Cammack et al. |
| D358,868 S | | 5/1995 | Hembree et al. |
| 5,458,766 A | | 10/1995 | Ehara et al. |
| D365,380 S | | 12/1995 | Wilcock |
| 5,510,031 A | | 4/1996 | Knauf, Jr. et al. |
| 5,525,214 A | | 6/1996 | Hembree |
| 5,527,451 A | | 6/1996 | Hembree et al. |
| D373,173 S | | 8/1996 | Valley et al. |
| D378,122 S | | 2/1997 | Milrud et al. |
| 5,608,928 A | | 3/1997 | Wang |
| RE35,667 E | | 11/1997 | Heiligman |
| 5,699,832 A | | 12/1997 | Burchard et al. |
| D392,023 S | | 3/1998 | Milrud et al. |
| 5,735,467 A | | 4/1998 | Lee |
| 5,744,033 A | | 4/1998 | Bertrand et al. |
| 5,788,160 A | | 8/1998 | Woog |
| D406,317 S | | 3/1999 | Hill et al. |
| D409,721 S | | 5/1999 | Burchard et al. |
| 5,928,504 A | | 7/1999 | Hembre et al. |
| D415,822 S | | 10/1999 | Ouyoung |
| 5,976,362 A | * | 11/1999 | Wadsworth et al. |
| 5,983,938 A | | 11/1999 | Bowers et al. |

OTHER PUBLICATIONS

Robert R. Butin and Dwight T. Lohkamp, "Melt Blowing—A One–Step Web Process for New Nonwoven Products", *Journal of the Technical Association of the Pulp and Paper Industry*, vol. 56, No. 4, pp. 74–77 (1973).

* cited by examiner

FAUCET-MOUNTED WATER FILTRATION DEVICE

PRIORITY CLAIM

The present application hereby claims priority based on Provisional Application Serial No. 60/200,799, filed May 1, 2000.

BACKGROUND

The present invention relates to a fluid filtration and dispensing device. More specifically, the present invention is directed to a "point of use" water filtration device that allows selection between a flow of filtered or unfiltered water.

Fluid filtration devices have been developed for applications not requiring the scale or volume of municipal or industrial filtering systems. Such devices range from those located at the "point of use" (e.g., the faucet of a kitchen sink, gravity-flow dispensers such as water pitchers, and low-pressure dispensers such as sports bottles) to generally bulkier "point-of-entry" units hidden from view and incorporated within the plumbing system of a building or facility.

Some point-of-use systems are designed for installation at the end of a conventional faucet assembly. However, these systems tend to be bulky and take up valuable space in and around the sink and faucet. Also, current faucet mounted devices are generally off-set to the side of the tap and may require a large housing to contain the filter media. In addition to consuming needed sink space, these units may not be aesthetically acceptable to consumers.

Accordingly, a need exists for an improved point-of-use faucet mounted water filtration device suitable in size and scale for residential or office use. For example, an improved system is desirable that allows a user to select between filtered or unfiltered fluid and saves space when used with a conventional faucet assembly.

SUMMARY OF THE INVENTION

Objects and advantages of the invention will be set forth in the following description, or may be apparent from the description, or may be learned through practice of the invention.

An improved compact or "slim" profile fluid filtering device is provided by the present invention. The filtering device is particularly suited as a point-of-use filter device that is attachable to a conventional faucet for filtering water dispensed from the faucet. The filtering device thus has residential as well as industrial or commercial business applications.

In one embodiment, the filtering device includes a housing having a forward end, a rear end, a top surface, and a bottom surface. A mounting mechanism is provided on the top surface proximate to the forward end of the housing. This mounting mechanism may take on various configurations for removably attaching the filtering device to a supply source, such as a faucet or spigot. A fluid inlet is defined through the top surface of the housing, and at least one fluid outlet is defined through the bottom surface of the housing. Separate fluid outlets may be defined for filtered and unfiltered flows.

A variably positionable valve member is operationally disposed within the housing between the fluid inlet and the fluid outlets. In one embodiment, this valve member is a ball valve seated in a corresponding concave cavity or recess defined internally in the housing. The valve member is rotatable relative to the housing between a filtered position and an unfiltered position.

At least one elongated filter is disposed generally longitudinally within a portion of the housing that extends rearward of the mounting mechanism. This filter is in fluid communication with the fluid inlet and the fluid outlet. The filter is preferably removable from the housing.

An actuator is provided to move the valve member between the filtered and unfiltered positions. The actuator may extend forward of the mounting mechanism at the forward end of the housing and is connected to the valve member through the housing. In one embodiment, this connection is made by axle ends connected to the valve member that extend through the housing. The actuator is connected to the axle such that movement of the actuator relative to the housing moves the valve member between the filtered and unfiltered positions. In the filtered position, the valve member directs fluid entering the fluid inlet to the filter. The fluid is conducted through the filter and then out the filtered fluid outlet. In the unfiltered position, the valve member directs fluid entering the fluid inlet directly to a fluid outlet without passing through the filter.

The device, and particularly the housing, is configured such that upon mounting the device to the end of a supply member, such as a generally horizontally disposed faucet or spigot, the portion of the housing containing the filter extends longitudinally adjacent to the supply member and rearwardly from the end of the supply member. In this manner, the filtering device does not take up or interfere with the usable space in the sink or basin and extends adjacent to and underneath of the faucet or spigot. The same concept applies if the supply member is a generally vertically disposed faucet. In this case, the housing portion containing the filter may be angled relative to the portion incorporating the mounting mechanism, or may be pivotal relative thereto, so as to extend generally adjacent to the vertically disposed faucet.

The housing may preferably include a longitudinally extending recess defined in the top surface thereof to accommodate the supply member. A portion of the underside of the faucet may extend into or "nest" in this recess. With this embodiment, the housing may also define longitudinally extending lobes on each side of the recess. The filter is disposed in at least one of these lobes.

It may be desired that the filtering device includes an additional filter. In the embodiment wherein the housing includes longitudinally extending lobes, this additional filter may be disposed in the other lobe. The filters may be made of different filtering media such that one of the filters removes a first contaminant or set of contaminants and the other filter removes a second type of contaminant from the fluid or water flowing through the filters.

It may be desirable that the filters are removably inserted into the housing to facilitate replacement. In one embodiment, the filters are insertable through the rear end of the of the housing. The filters may be mounted to a cap member that is attachable to the rear end of the housing. In an embodiment wherein two filters are utilized and are arranged so as to extend generally parallel and longitudinally from the cap member, a fluid conduit or passage is provided in the cap member so that the fluid may pass from one filter to the other.

The actuator may be a pivotally mounted switch or similar device and is operated by a user simply pressing on the actuator switch in a direction to move the valve body between the filtered and unfiltered positions. This switch may define a forwardmost projection of the filtering device.

It may also be desired to provide a visible indicator configured on the housing to give the user a visible indication of the depletion state of the filter. This indicator may be a mechanical type indicator that, for example, simply counts the number of actuations of the device, or may be an electronic counter volume meter, or timing indicator. A power supply, such as a battery, and circuitry for the electronic indicator may be housed in one of the side lobes of the housing.

As described in greater detail herein, the filters may be made of any manner of suitable filtering media for removing particular contaminants from the fluid or water source.

DETAILED DESCRIPTION

Reference will now be made in detail to embodiments of the invention, one or more examples of which are set forth below. Each example is provided by way of explanation of the invention, and not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention include such modifications and variations.

The present invention relates to a filtering device that can be connected to a point-of-use supply member, such as a conventional faucet. For purposes of the following description, the filtering device according to the invention will be illustrated and described with respect to an embodiment wherein it is connected to a conventional faucet. It should be appreciated that this configuration is not a limitation of the invention. The filtering device may be utilized with any type of supply member, such as a hose, pipe, spigot, etc. Also, while the invention is illustrated and described in terms of a faucet mounted filtering device for filtering water, it should be appreciated that the filtering device is not limited to water filtration, and may be utilized in any application requiring a filtered fluid.

A detailed description of the mechanical components and operation of embodiments of the filtering device is provided below followed by a detailed discussion related to suitable filter materials or media particularly useful in the present invention.

Particular embodiments of the filtering device are illustrated in the figures. It should be appreciated that certain features, such as seals and fluid pressure containment structure, are not shown or described in great detail as one skilled in the art could readily configure any number of variations of such components for use in the present invention.

An embodiment of filtering device 10 according to the invention includes a housing, generally 14. Housing 14 may be formed of any suitable material, such as a formed or molded plastic, metal, or the like. The housing 14 has a forward end 16, a rear end 18, a top surface 20, and a bottom surface 22. In the depicted embodiment, the housing tapers in the direction of forward end 16 from rear end 18 such that body 14 has a general trapezoidal shape. This shape contributes to the aesthetically pleasing profile of the filtering device 10.

A mounting mechanism, generally 38, is provided for filtering device 10. The mounting mechanism 38 may include any suitable and known device for connecting housing 14 to the end of a fluid supply member, such as a conventional spigot or faucet 12 illustrated in the figures. In the embodiment illustrated, mounting mechanism 38 incorporates a conventional threaded coupling member 40. Threaded coupling 40 is not illustrated in great detail since such devices are well understood by those skilled in the art. It should be appreciated that other coupling devices may also be utilized, including quick connect devices, snap-fit devices, etc.

A fluid inlet 42 is defined through top surface 20 of housing 14. In the embodiment illustrated, fluid inlet 42 is defined by threaded coupling member 40 such that when the member 40 is engaged with the end of a supply member 12, fluid from the supply member is conducted directly to fluid inlet 42. This configuration is more clearly illustrated in the cross-sectional views of FIGS. 3A and 3B.

At least one fluid outlet is defined through bottom surface 22 of the housing 14. In the embodiment illustrated, an unfiltered fluid outlet 46 is defined in the housing 14 directly opposite from fluid inlet 42. A separate filtered fluid outlet 48 is also defined through the bottom surface 22 offset from fluid inlet 42. The operation of filtered fluid outlet 48 will be described in greater detail below.

A positionable valve member, such as ball valve 70 is operationally disposed within housing 14 between fluid inlet 42 and fluid outlets 46, 48. Ball valve 70 is rotationally disposed within a generally concave cavity or recess 34 defined in a forward portion of housing 14. Ball valve 70 has a first unfiltered fluid channel 72 defined therethrough, and a second filtered fluid channel 74 defined therethrough generally parallel to first channel 72. Suitable sealing devices, such as O-rings or gasket material 76, are provided between cavity 34 and ball valve 70 to ensure a fluid-tight seal between the components. It should be appreciated that the ball valve arrangement illustrated in the figures is but one embodiment of any number of variations of positionable valves that may be utilized to direct flow within the present invention.

Filtering device 10 also includes at least one elongated filter disposed longitudinally within a portion of housing 14 rearward of mounting mechanism 38. In the illustrated embodiments, two such filters 52a and 52b are illustrated. Filters 52a and 52b are generally elongated cylinder type filters having outer circumferential surfaces 54a, 54b and inner channels 56a, 56b. Each filter has a forward end 58a, 58b and a rear end 60a, 60b. This cylinder configuration may be preferred in that the filters are readily molded in this shape. When two such filters are utilized, each filter may be of a different type of filtering media so that each filter eliminates a different particular contaminant(s) from fluid passing therethrough.

Figure 1:
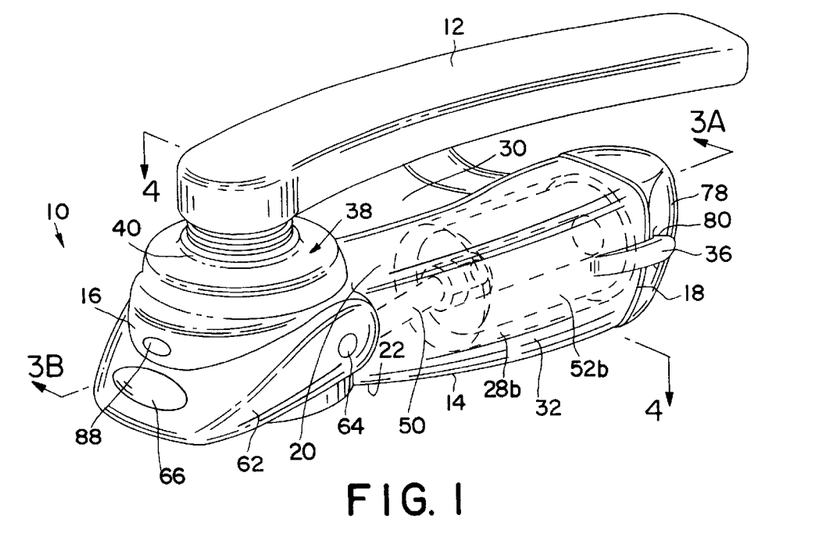
FIG. 1 is a perspective view of an embodiment of the filtering device according to the invention in combination with a conventional faucet.
Figure 2:
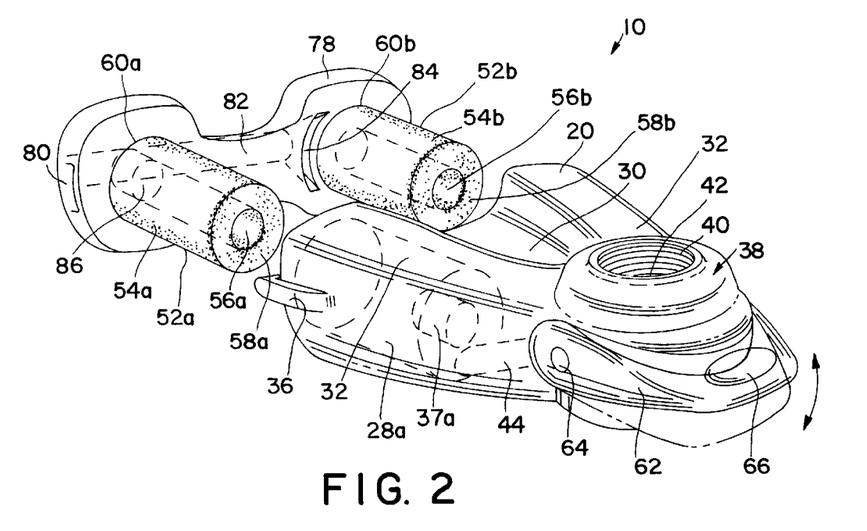
FIG. 2 is an alternative perspective view of a filtering device according to the invention.

The filters 52a, 52b are in fluid communication with fluid inlet 42 and filtered fluid outlet 48. The filters are inserted into respective cavities 28a, 28b defined in housing 14, for example in side lobes 32 of the housing 14. The filters 52a, 52b are removably seated in the housing cavities 28a, 28b by means of an end cap member 78. Referring particularly to FIG. 2, rear ends 60a, 60b of the filters are mounted onto cap member 78 so as to extend longitudinally therefrom. The cap member 78 is then connected to body 14 so that the filters reside within their respective cavities. In this regard, any conventional latching or attaching mechanism may be utilized to seat cap member 78 to rear end 18 of housing 14. In the embodiment illustrated, a simple resilient latch member 36 is provided on each side of housing 14. The latches 36 snap into recesses 80 provided on the sides of cap member 78. In this manner, an operator simply needs to manually release the latches 36 to pull cap member 78 and attached filters away from housing 14 so that the filters may be inspected, replaced, etc. Suitable seals 81 are provided between cap member 78 and rear end 18 of housing 14.

An actuator 62 extends forward of mounting mechanism 38 at the forward end 16 of the housing. The actuator 62 may define the forwardmost point of filtering device 10. The actuator 62 is mechanically connected to the valve member, such as ball valve 70, through housing 14. In the embodiment illustrated, axle ends 64 extend from ball valve 70 through the sides of housing 14. The actuator 62 includes side arms that are rigidly connected to axle ends 64. In this manner, movement of actuator 62 in an up or down direction results in relative movement of ball valve 70 within housing 14. A recess or depression 66 may be provided on the upper surface of actuator 62 for defining a convenient place for the user to depress the actuator. In this configuration, actuator 62 acts as a "switch" that is movable between a filtered position and an unfiltered position. The unfiltered position is illustrated particularly in FIG. 3A. In the unfiltered position, ball valve 70 is rotated such that channel 72 is in direct alignment with fluid inlet 42 and unfiltered fluid outlet 46. Thus, fluid from the supply member will flow directly through the device 10 without passing through the filter elements.

Figure 3A:
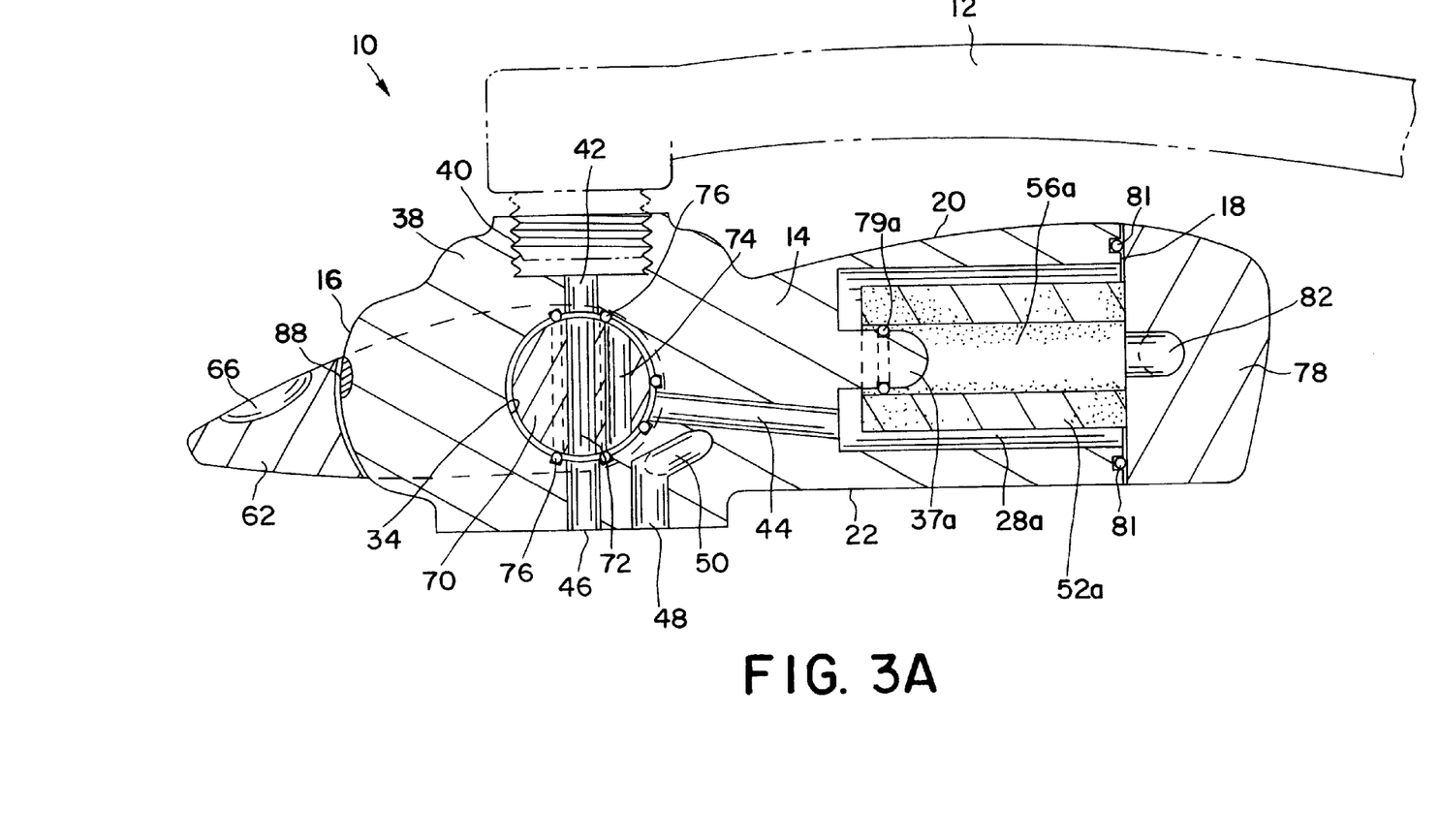
FIG. 3A is a partial cross-sectional view of the filtering device taken along the line indicated in FIG. 1 and particularly shows the device in the unfiltered position.
Figure 3B:
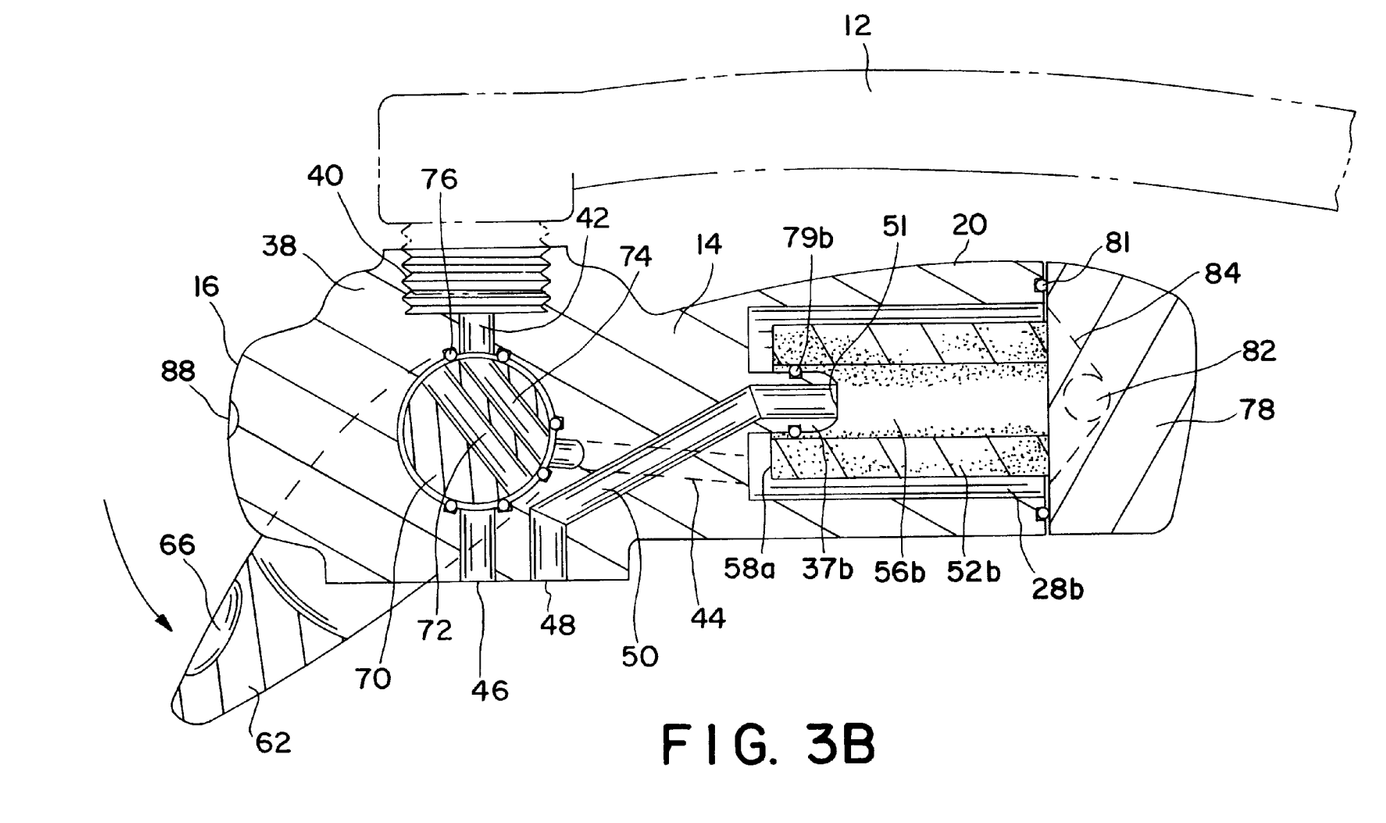
FIG. 3B is a partial cross-sectional view of the filtering device taken along the line indicated in FIG. 1 and particularly illustrating the device in the filtered position.

FIG. 3B illustrates actuator 62 after it has been depressed by the user. Actuator 62 has caused the ball valve 70 to rotate such that the second or filtered fluid channel 74 is brought into alignment with fluid inlet 42. The unfiltered fluid outlet 46 is blocked by ball valve 70. Fluid flow through the filters will be described in greater detail below.

As can be seen in the figures, upon mounting of filtering device 10 to the end of supply member 12, the portion of housing 14 containing the filter or filters extends rearwardly from the end of the supply member and is disposed longitudinally adjacent to the supply member. In this manner, filtering device 10 takes up minimal critical space around supply member 12 and any associated sink or basin. To further minimize space, it may be desirous to provide a longitudinally extending recess 30 in top surface 20 of housing 14. This surface 30 may be defined between side lobes 32 that house filters 52a and 52b. The recess 30 allows for a decreased clearance space between the underside of supply member 12 and top surface 20 of housing 14. Although not particularly illustrated in the figures, it should be appreciated that the longitudinal recess 30 may actually allow for side portions of the housing to wrap at least partially around supply member 12 such that the supply member "nests" in the recess 30. In the embodiment illustrated, the rear portion of the housing containing the filters lies in a common plane with the forward end of the housing. This embodiment is particularly useful if the faucet is a generally horizontally extending faucet.

It should be appreciated that filtering device 10 is not limited to configuration with a generally horizontal supply member 12. Vertically extending faucets are also well known in the art and the present filtering device is just as useful with these devices. When configured with such a vertical supply member, the rear portion of housing 14 containing filters 52a, 52b, would desirably be disposed at an angle relative to the front portion of housing 14 that defines fluid inlet 42 and contains mounting mechanism 38. For example, the rear portion of the housing containing the filters may be disposed at any desired angle to compliment the angle of the faucet so that the substantial portion of the filtering device 10 is disposed longitudinally adjacent to the faucet. The housing may be molded so that the rear portion of the housing and the forward portion of the housing define an angle therebetween. In an alternative embodiment not illustrated in the figures, the rear portion of housing 14 may be pivotally mounted to the forward portion of the housing 14. It should be appreciated that this pivotal configuration would require a fluid tight pivotal seal between the components. It is well within the level of those skilled in the art to configure such a fluid tight connection. It should thus be appreciated that housing 14 is not limited by any particular configuration so long as the substantial portion of the housing containing the filters extends longitudinally adjacent to supply member 12 regardless of the orientation of the supply member.

Figure 4:
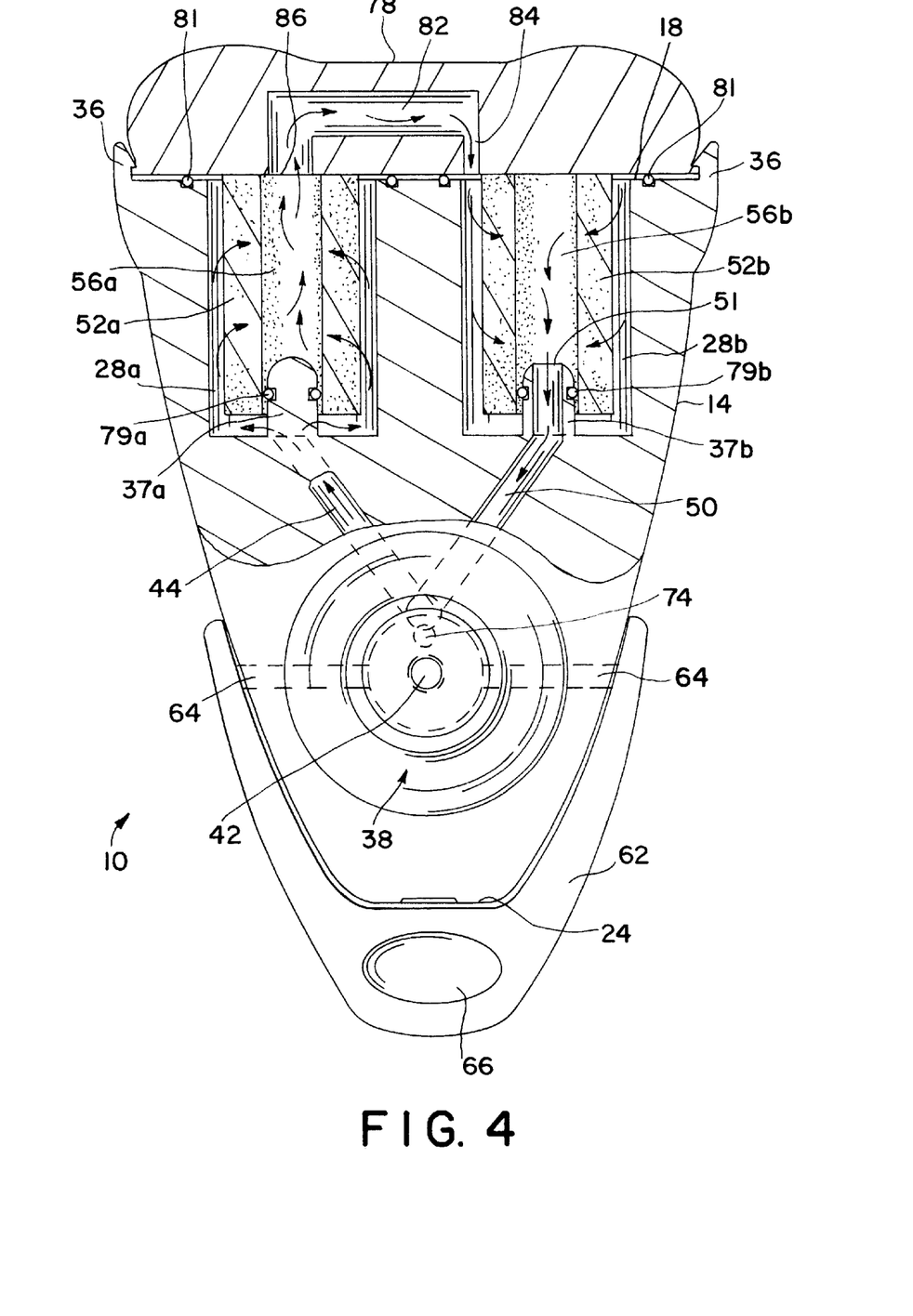
FIG. 4 is a top cross-sectional view of the filtering device taken along the line indicated in FIG. 1 particularly illustrating fluid flow through the device in the filtered position.

Fluid flow through the filters is particularly illustrated in FIGS. 3A, 3B, and the top cross-sectional view of FIG. 4. Once actuator 62 has been depressed by the user into the position illustrated in FIG. 3B, filtered fluid channel 74 of ball valve 70 is brought into alignment with fluid inlet 42. The downstream end of channel 74 is brought into alignment with an inlet conduit 44 defined in the housing. Conduit 44 directs the fluid into cavity 28a, as particularly seen in FIGS. 2 and 3A. The filter 52a is radially positioned within cavity 28a by means of an alignment nub 37a. A seal 79a is provided around the alignment nub 37a to ensure a fluid tight seal therewith. The fluid enters cavity 28a and passes and flows around outer circumferential surface 54a of filter element 52a. The fluid will pass through the filter into channel 56a. From this channel, the fluid will flow through an inlet 86 of a fluid channel 82 defined through cap member 78. The fluid will flow out of an outlet, such as a circumferential port 84 of fluid channel 82, into the other filter element channel 28b, as particularly seen in FIG. 4. Filter element 52b is also held in its respective cavity 28b by means of an alignment nub 37b and respective seal 79b. The fluid will flow around outer circumferential surface 54b and through filter element 52b, and into channel 56b. The fluid will then flow from channel 56b into an inlet 51 of a filtered fluid conduit 50, as particularly seen in FIGS. 3B and 4. From conduit 50, the filtered fluid will flow out of filtering device 10 through filtered fluid outlet 48. It should be appreciated that the fluid conduits and direction of fluid through the filters illustrated in the figures is but one example of any number of variations. For example, the fluid could also be directed initially into the inner channels of the filter elements so as to flow radially outward and into the respective cavities housing the filters.

It may also be desired to provide an indicator 88 within filtering device 10 so as to give the user a visible indication of the state of the filter. This indicator 88 may comprise any manner of mechanical or electrical device. For example, indicator 88 may be a simple mechanical counter that counts each cycle of the actuator 62. Upon reaching a predetermined number of cycles, the indicator may provide some visible indication, such as a change of color, a visible flag, or the like.

Figure 5:
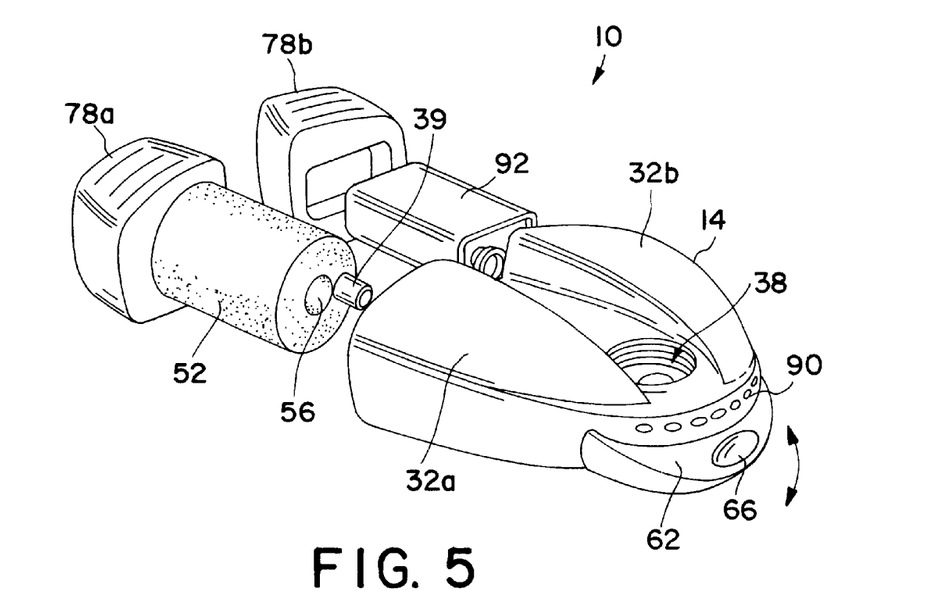
FIG. 5 is a perspective view of an alternative embodiment of the filtering device according to the invention showing indicator elements.

An alternative embodiment of the invention is illustrated in FIG. 5. In this embodiment, a single filter 52 is housed in side lobe 32a of housing 14. In this embodiment, it should be understood that unfiltered fluid would be directed either around the outer circumferential surface of filter 52 so as to pass through the filter and out of channel 56 before being dispensed out of filtering device 10. Alternatively, the unfiltered fluid may pass into channel 56 and radially outward into the respective cavity for the filter 52. The supply and return conduits or channels within the filter housing would be provided accordingly. In this embodiment, filter 52 is mounted to a single end cap 78a. An alignment nub 39 may be provided on the forward end of the filter 52 to ensure proper rotational positioning of filter 52 within its cavity defined in side lobe 32a.

The embodiment of FIG. 5 utilizes an electronic indicator, such as a light-emitting diode (LED) display 90. Display 90 may take on any manner of visible indications. For example, in the embodiment illustrated, each LED may represent a certain number of cycles of the actuator 62. Upon indication of a predetermined number of cycles, the user would know to replace the filter element 52. The circuitry and a power supply, such as battery 92, may be housed within the opposite side lobe 32b of the housing 14.

A detailed description of filtering materials and media that may form the filter elements for the present invention is provided below.

As used herein, the term "charge-modified material" means any material that has an electric charge upon at least some of its surfaces. The charge may be cationic or anionic, and of any magnitude.

As used herein, the term "nonwoven web" means a web or fabric having a structure of individual fibers or threads which are interlaid, but not in an identifiable manner as in a knitted or woven fabric. Nonwoven webs generally may be prepared by methods which are well known to those having ordinary skill in the art. Examples of such processes include, by way of illustration only, meltblowing, coforming, spunbonding, carding and bonding, air-laying, and wet-laying. Meltblowing, coforming, and spunbonding processes are exemplified by the following references, each of which is incorporated herein by reference:

(a) meltblowing references include, by way of example, U.S. Pat. No. 3,016,599 to R. W. Perry, Jr., U.S. Pat. No. 3,704,198 to J. S. Prentice, U.S. Pat. No. 3,755,527 to J. P. Keller et al., U.S. Pat. No. 3,849,241 to R. R. Butin et al., U.S. Pat. No. 3,978,185 to R. R. Butin et al., and U.S. Pat. No. 4,663,220 to T. J. Wisneski et al. See, also, V. A. Wente, "Superfine Thermo plastic Fibers", *Industrial and Engineering Chemistry*, Vol. 48, No. 8, pp.1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973);

(b) coforming references include U.S. Pat. No. 4,100,324 to R. A. Anderson et al. and U.S. Pat. No. 4,118,531 to E. R. Hauser; and (c) spunbonding references include, among others, U.S. Pat. Nos. 3,341,394 to Kinney, U.S. Pat. No. 3,655,862 to Dorschner et al., U.S. Pat. No. 3,692,618 to Dorschner et al., U.S. Pat. No. 3,705,068 to Dobo et al., U.S. Pat. No. 3,802,817 to Matsuki et al., U.S. Pat. No. 3,853,651 to Porte, U.S. Pat. No. 4,064,605 to Akiyama et al., U.S. Pat. No. 4,091,140 to Harmon, U.S. Pat. No. 4,100,319 to Schwartz, U.S. Pat. No. 4,340,563 to Appel and Morman, U.S. Pat. No. 4,405,297 to Appel and Morman, U.S. Pat. No. 4,434,204 to Hartman et al., U.S. Pat. No. 4,627,811 to Greiser and Wagner, and U.S. Pat. No. 4,644,045 to Fowells.

A "nonwoven charge-modified microfiber glass web" may be prepared from a fibrous web which incorporates glass fibers having a cationically-charged coating thereon. Generally, such microfibers would be glass fibers having a diameter of about 10 microns or less. The coating includes a functionalized cationic polymer which has been crosslinked by heat; in other words, the functionalized cationic polymer has been crosslinked by heat after being coated onto the glass fibers. Such a fibrous filter is prepared by a method which involves providing a fibrous filter which includes glass fibers, passing a solution of a functionalized cationic polymer crosslinkable by heat through the fibrous filter under conditions sufficient to substantially coat the fibers with the functionalized cationic polymer, and treating the resulting coated fibrous filter with heat at a temperature and for a time sufficient to crosslink the functionalized cationic polymer present on the glass fibers. The functionalized cationic polymer may be an epichlorohydrin-functionalized polyamine or an epichlorohydrin-functionalized polyamido-amine.

In general, when used as a filter media, a "charge-modified microfiber glass web" will contain at least about 50 percent by weight of glass fibers, based on the weight of all fibers present in the filter media. In some embodiments, essentially 100 percent of the fibers will be glass fibers. When other fibers are present, however, they generally will be cellulosic fibers, fibers prepared from synthetic thermoplastic polymers, or mixtures thereof.

As used herein, the terms "cationically-charged" in reference to a coating on a glass fiber and "cationic" in reference to the functionalized polymer mean the presence in the respective coating and polymer of a plurality of positively-charged groups. Thus, the terms "cationically-charged" and "positively-charged" are synonymous. Such positively-charged groups typically will include a plurality of quaternary ammonium groups, but they are not necessarily limited thereto.

The term "functionalized" is used herein to mean the presence in the cationic polymer of a plurality of functional groups, other than the cationic groups, which are capable of crosslinking when subjected to heat. Thus, the functional groups are thermally crosslinkable groups. Examples of such functional groups include epoxy, ethylenimino, and episulfido. These functional groups readily react with other groups typically present in the cationic polymer. The other groups typically have at least one reactive hydrogen atom and are exemplified by amino, hydroxy, and thiol groups. It may be noted that the reaction of a functional group with another group often generates still other groups which are capable of reacting with functional groups. For example, the reaction of an epoxy group with an amino group results in the formation of a $\beta$-hydroxyamino group.

Thus, the term "functionalized cationic polymer" is meant to include any polymer which contains a plurality of positively charged groups and a plurality of other functional groups which are capable of being crosslinked by the application of heat. Particularly useful examples of such polymers are epichlorohydrin-functionalized polyamines and epichlorohydrin-functionalized polyamido-amines. Both types of polymers are exemplified by the Kymene® resins which are available from Hercules Inc., Wilmington, Del. Other suitable materials include cationically-modified starches, such as RediBond, from National Starch.

As used herein, the term "thermally crosslinked" means the coating of the functionalized cationic polymer has been heated at a temperature and for a time sufficient to crosslink the above-noted functional groups. Heating temperatures typically may vary from about 50° C. to about 150° C. Heating times in general are a function of temperature and the type of functional groups present in the cationic polymer. For example, heating times may vary from less than a minute to about 60 minutes or more. Heating times and temperatures are also determined by the amount of solution in the web which must be evaporated.

As discussed briefly above, a nonwoven charge-modified meltblown web may consist of hydrophobic polymer fibers, amphiphilic macromolecules adsorbed onto at least a portion of the surfaces of the hydrophobic polymer fibers, and a crosslinkable, functionalized cationic polymer associated with at least a portion of the amphiphilic macromolecules, in which the functionalized cationic polymer has been crosslinked. Crosslinking may be achieved through the use of a chemical crosslinking agent or by the application of heat. Desirably, thermal crosslinking, i.e., the application of heat, will be employed. In general, the amphiphilic macromolecules may be of one or more of the following types: proteins, poly(vinyl alcohol), monosaccharides, disaccharides, polysaccharides, polyhydroxy compounds, polyamines, polylactones, and the like. Desirably, the amphiphilic macromolecules will be amphiphilic protein macromolecules, such as globular protein or random coil protein macromolecules. For example, the amphiphilic protein macromolecules may be milk protein macromolecules. The functionalized cationic polymer typically may be any polymer which contains a plurality of positively-charged groups and a plurality of other functional groups which are capable of being crosslinked by, for example, chemical crosslinking agents or the application of heat. Particularly useful examples of such polymers are epichlorohydrin-functionalized polyamines and epichlorohydrin-functionalized polyamido-amines. Other suitable materials include cationically modified starches.

The nonwoven charge-modified meltblown web may be prepared by a method which involves providing a fibrous meltblown filter media which includes hydrophobic polymer fibers, passing a solution containing amphiphilic macromolecules through the fibrous filter under shear stress conditions so that at least a portion of the amphiphilic macromolecules are adsorbed onto at least some of the hydrophobic polymer fibers to give an amphiphilic macromolecule-coated fibrous web, passing a solution of a crosslinkable, functionalized cationic polymer through the amphiphilic macromolecule-coated fibrous web under conditions sufficient to incorporate the functionalized cationic polymer onto at least a portion of the amphiphilic macromolecules to give a functionalized cationic polymer-coated fibrous web in which the functionalized cationic polymer is associated with at least a portion of the amphiphilic macromolecules, and treating the resulting coated fibrous filter with a chemical crosslinking agent or heat. Desirably, the coated fibrous filter will be treated with heat at a temperature and for a time sufficient to crosslink the functionalized cationic polymer.

It is to be understood that changes and variations may be made by those of ordinary skill in the art without departing from the spirit or the scope of the present invention, which is set forth in the following claims.

What is claimed is:

1. A fluid filtering device, comprising:
   a housing defining
      a forward end;
      a rear end;
      a top surface defining fluid inlet; and
      a bottom surface defining a fluid outlet;
   a mounting mechanism disposed on said top surface;
   a valve disposed within aid housing and in fluid communication with said inlet and said outlet;
   a filter disposed within s id housing in fluid communication with said fluid inlet and said fluid outlet;
   a valve actuator configured to position said valve to either:
      direct fluid enterin said inlet through said filter in a filtered position; or
      direct fluid enterin said inlet to said outlet without passing through said filter in an unfiltered position;
   said housing containing said filter disposed so as to extend rearwardly from said actuator in longitudinal juxtaposition to a fluid source in operation of said device; and
   wherein said housing further defines a longitudinally extending recess in said top surface having a shape an configuration so that at least a portion of said fluid source is within said recess.

2. The filtering device as in claim 1, wherein said housing defines a rearwardly extending lobe on each side of said recess, said filter disposed in one of said lobes.

3. The filtering device as in claim 2, further comprising an additional said filter disposed in the other of said lobes.

4. The filtering device as in claim 1, wherein said filter is insertable into said housing through said rear end, said filter mounted to a cap member attachable to said rear end.

5. The filtering device as in claim 4, further comprising an additional said filter, wherein said filters are mounted so as to extend longitudinally from said cap member.

6. The filtering device as in claim 2, wherein said actuator comprises a pivotally mounted switch and said valve comprises a rotatable valve body that is rotatable between said filtered and unfiltered positions upon pivotal movement of said switch.

7. The filtering device as in claim 6, wherein said switch defines a forward most projection of said device.

8. The filtering device as in claim 1, further comprising a visible indicator configured on said housing to give a user a visible indication of a state of depletion of said filter.

9. The filtering device as in claim 8, wherein said indicator is an electronic indicator and said housing further contains a power supply for said indicator.

10. The filtering device as in claim 1, wherein said filter is one of an activated carbon material, charge-modified material, and electrostatically charged material.

11. A slim profile fluid filtering device, comprising:
   a housing, said housing defining a forward end, a rear end, a top surface, and a bottom surface;
   a mounting mechanism disposed on said top surface proximate said forward end;
   a fluid inlet defined through said housing top surface, and a fluid outlet defined through said bottom surface;

a positionable valve member operationally disposed within said housing between said fluid inlet and said fluid outlet;

at least two filters disposed longitudinally within said housing rearward of said mounting mechanism and in serial fluid communication with each other, said fluid inlet, and said fluid outlet, said filters insertable into said housing through said rear end of said housing, said filters made of different filtering media such that one of said filters removes a first contaminant and the other said filter removes a second contaminant from fluid flowing through said housing;

an actuator extending from a forward most end of said housing and connected with said valve member through said housing, said actuator movable relative to said housing between a filtered Position wherein said valve member directs fluid entering said fluid inlet into said housing, through said filters and out said fluid outlet, and an unfiltered position wherein said valve member directs fluid entering said fluid inlet directly out said fluid outlet;

said portion of said housing containing said filters extending generally horizontally and rearwardly from said actuator with one of said filters disposed along each longitudinal side thereof; and wherein said housing defines a central longitudinally extending recess in said top surface between side lobe containing said filters such that a supply source nests at least partially within said recess upon mounting said device thereto.

12. The filtering device as in claim 11, wherein said filters are mounted adjacent to each other and longitudinally from a common cap member, said cap member removably attachable said rear end of said housing.

13. The filtering device as in claim 11, further comprising an indicator to give a visible indication to a user of a depletion state of said filters.

14. The filtering device as in claim 11, wherein said device is attachable to a faucet.

15. The filtering device as in claim 11, wherein said actuator comprises a pivotally mounted switch and said valve comprises a rotatable valve body that is rotatable between said filtered and unfiltered positions upon pivotal movement of said switch.

16. A slim profile fluid filtering device, comprising:

a housing, said housing defining a forward end, a rear end, a top surface, and a bottom surface;

a mounting mechanism disposed on said top surface proximate said forward end;

a fluid inlet defined through said housing top surface, and a fluid outlet defined through said bottom surface;

a positionable valve member operationally disposed within said housing between said fluid inlet and said fluid outlet;

at least two filters disposed longitudinally within said housing rearward of said mounting mechanism and in s rial fluid communication with each other, said fluid inlet, and said fluid outlet, said filters insertable into said housing through said rear end of said housing, said filters made of different filtering media such that one of said filters removes a first contaminant and the other said filter removes a second contaminant from fluid flowing t rough said housing;

an actuator extending from a forward most end of said housing and connected with said valve member through said housing, said actuator movable relative to said housing between a filtered position wherein said valve member directs fluid entering said fluid inlet into said housing through said filters and out said fluid outlet, and an unfiltered position wherein said valve member directs fluid entering said fluid inlet directly out said fluid outlet;

said portion of said ho sing containing said filters extending generally horizontally and rearwardly from said actuator with one of said filters disposed along each longitudinal side thereof;

wherein said actuator comprises a pivotally mounted switch and said valve comprises a rotatable valve body that is rotatable between said filtered and unfiltered positions upon pivotal movement of said switch; and wherein said valve body is rotatable within a cavity of said housing and contains axle ends extending out of opposite sides of said housing, said actuator mounted to said axle ends.

* * * * *